(12) United States Patent
Nakahara et al.

(10) Patent No.: US 7,535,147 B2
(45) Date of Patent: May 19, 2009

(54) TURBINE GENERATOR HAVING AN A/C EXCITER

(75) Inventors: Akihito Nakahara, Hitachi (JP);
Kazumasa Ide, Hitachiota (JP);
Mamoru Kimura, Hitachi (JP);
Kazuhiko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 11/356,104

(22) Filed: Feb. 17, 2006

(65) Prior Publication Data

US 2006/0214528 A1 Sep. 28, 2006

(30) Foreign Application Priority Data

Mar. 25, 2005 (JP) .............. 2005-087482

(51) Int. Cl.
*H02K 21/12* (2006.01)
(52) U.S. Cl. ................................. 310/156.53
(58) Field of Classification Search ............ 310/156.49, 310/156.25, 156.59
See application file for complete search history.

(56) References Cited

U.S. PATENT DOCUMENTS

| | | | | |
|---|---|---|---|---|
| 2,712,084 A | * | 6/1955 | Bridenbaugh ............... | 310/216 |
| 3,644,767 A | * | 2/1972 | Kasargod et al. ............ | 310/254 |
| 4,472,651 A | | 9/1984 | Jones | |
| 5,239,221 A | * | 8/1993 | Juan ............................ | 310/258 |
| 5,371,426 A | * | 12/1994 | Nagate et al. ........... | 310/156.49 |
| 5,424,593 A | * | 6/1995 | Vaghani et al. ................ | 310/64 |
| 6,093,984 A | * | 7/2000 | Shiga et al. .................... | 310/26 |
| 6,257,027 B1 | * | 7/2001 | Imai ........................... | 68/12.12 |
| 7,317,272 B2 | * | 1/2008 | Shiga ..................... | 310/156.12 |

FOREIGN PATENT DOCUMENTS

| | | |
|---|---|---|
| EP | 0 866 540 | 9/1998 |
| JP | 05-146103 | 6/1993 |
| JP | 7-336975 | 12/1995 |
| JP | 9-172760 | 6/1997 |
| JP | 10-336929 | 12/1998 |
| JP | 11089122 A * | 3/1999 |
| JP | 11103544 A * | 4/1999 |
| JP | 2001-8390 | 1/2001 |
| JP | 2001-119872 | 4/2001 |
| JP | 2002-300743 | 10/2002 |

* cited by examiner

*Primary Examiner*—Hanh N. Nguyen
(74) *Attorney, Agent, or Firm*—Antonelli, Terry, Stout & Kraus, LLP.

(57) ABSTRACT

The object of the invention is to provide a generator easy to assemble even if there is an obstacle such as a turbine in the axial direction of the rotor of the generator. A generator comprising: a rotor having a permanent magnet placed therein and supported to be rotatable, and a stator having a field coil wound thereon, characterized in that, the rotor is provided with a seating made of a magnetic material for supporting the permanent magnet and a pole shoe made of a magnetic material placed in the outward radial direction of the permanent magnet.

7 Claims, 9 Drawing Sheets

TURBINE GENERATOR HAVING AN A/C EXCITER

CLAIM OF PRIORITY

The present application claims priority from Japanese application serial No. 2005-087482, filed on Mar. 25, 2005, the contents of which is hereby incorporated by references into this application.

BACKGROUND OF THE INVENTION

1. Field of the Invention

This invention relates to a generator employing permanent magnets for its excitation.

2. Description of Related Art

An example of a conventional generator having field permanent magnets inserted into slots is described in the official gazette, Japanese Application Patent Laid-Open Publication No. Hei 05-146103.

[Patent Document 1] Japanese Application Patent Laid-Open Publication No. Hei 05-146103

SUMMARY OF THE INVENTION

With such a generator employing permanent magnets for its magnetic field as described in Patent Document 1 above, it is inevitable that the permanent magnets need to be inserted into its rotor of the generator in the axial direction. In this case, there is an obstacle such as a turbine for the electric generating system in the axial direction of the rotor of the generator, the problem arises that it is difficult to insert permanent magnets to the generator.

The object of the invention is to provide a generator easy to assemble even if there is an obstacle such as a turbine in the axial direction of the rotor of the generator.

A feature of this invention is a generator which is provide with a rotor having a permanent magnet placed between a seating and a pole shoe.

Another feature of this invention is a generator which is provide with the above-mentioned permanent magnet of which width is greater than that of the seating.

Still another feature of this invention is a generator which is provide with a rotor having permanent magnets and being supported to be rotatable, and a stator having field windings wound on it, wherein the rotor is provided with seatings for supporting the permanent magnets, and the radius of the pole shoe arc part is smaller than that of the rotor.

Yet another feature of this invention is a generator which is provide with a rotor having permanent magnets and being supportedto be rotatable, and a stator having field windings wound on it, wherein the stator is so constructed in portions that the number of stator portions equals that of the parallel circuits in the field windings wound on the stator.

Further features of this invention will be described in the Preferable Embodiments of the Invention section.

According to the present invention, a permanent magnet is placed between a seating and a pole shoe, thus it is possible to provide a generator and/or an electric generating system which is easily assembled.

DETAILED DESCRIPTION OF THE INVENTION

Figure 10:
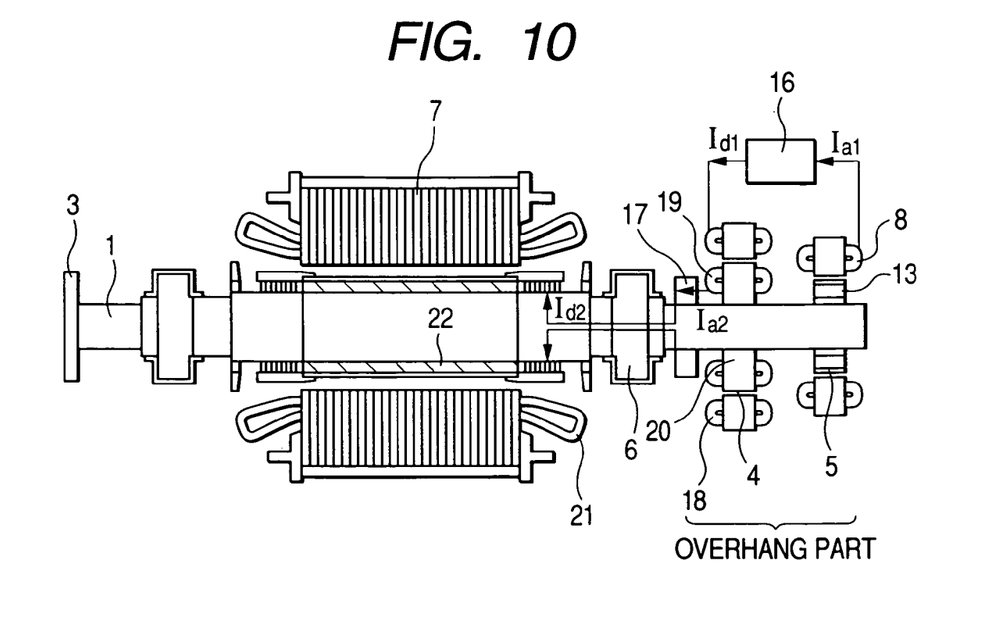
FIG. 10 is a sectional view of a comparative example of a turbine generator.

In FIG. 10, to explain the effects of the invention, a comparative example of a turbine generator having a brushless excitation system is shown. The turbine generator has an alternating-current exciter 4 and a sub-exciter 5 both in the overhang part located at an end of its rotor shaft 1. The sub-exciter 5 has a permanent magnet 13 in the rotor poles, and the permanent magnet 13 produces magnetic fields at right angles to armature windings 8 of the sub-exciter.

On the other hand, to a rotor shaft 1, a rotational force is applied by the turbine through a coupling 3, thus the rotor shaft is rotated. In this way, the armature coils 8 of the sub-exciter 5 has an alternating current $I_{a1}$ induced in them owing to electromagnetic induction. An auto voltage regulator 16 capable of rectification detects the voltage of the generator, changes this alternating current $I_{a1}$ into a direct current $I_{d1}$, and supplies it to the field coils 18 of the alternating-current exciter 4.

The armature coils 19 of the alternating-current exciter 4 are placed on the rotor 20 of the alternating-current exciter 4, thus the rotation of the rotor shaft 1 induces an alternating current $I_{a2}$ in the armature coils 19. The alternating current $I_{a2}$ is converted into a direct current through a rotating rectifier 17, and is supplied to turbine generator field coils 22. The rotation of the rotor shaft 1 induces an alternating current in turbine generator armature coils 21, making it possible to supply electric power outwards.

Figure 11:
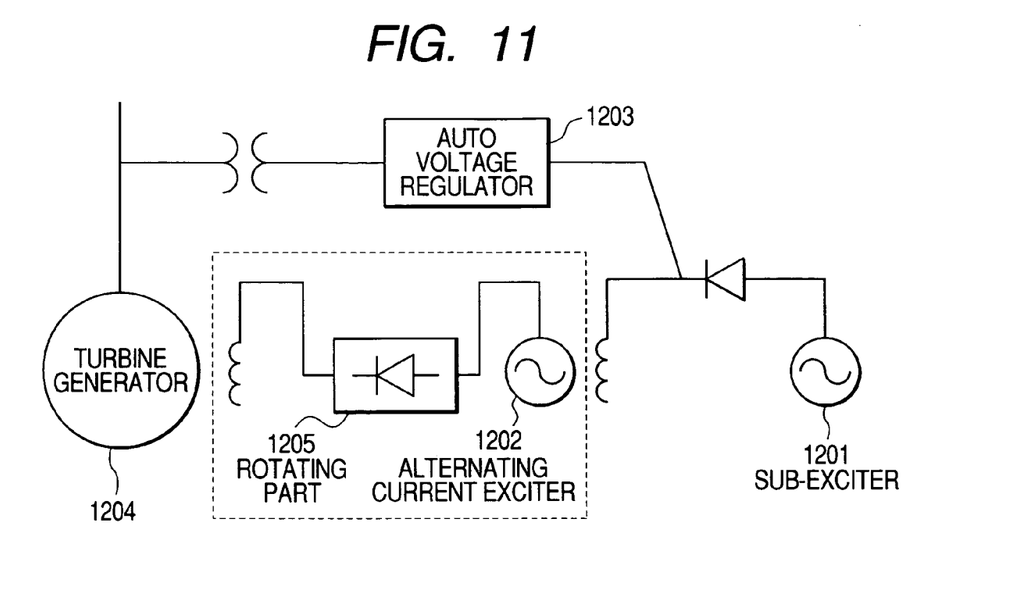
FIG. 11 is a diagram showing the circuit in a comparative example of a turbine generator.

In FIG. 11, an example of a circuit diagram showing a comparative example of a brushless excitation system. The magnitude of the alternating voltage arising from a sub-exciter 1201 is regulated by an auto voltage regulator 1203. This alternating voltage is converted by a rectifier into a direct voltage, resulting in a direct current flow on the output side of the sub-exciter 1201. This direct current gives off direct current magnetic fields, the electromagnetic induction of which produces an alternating current in an alternating-current exciter 1202 of a rotating part 1205. This alternating current is converted by the rectifier of the rotating part into a direct current, which is then supplied to the field coils of the rotating part.

When the rotating part rotates owing to the mechanical force of the turbine, the electromagnetic induction of the magnetic field given off by the direct current made to flow in the field coils gives rise to an alternating voltage in the armature windings on the side of the turbine generator stator (not shown in the figure). In the construction shown in FIG. 10, the overhang part has the sub-exciter 4 and the alternating-current exciter 5, which results in the problem of the overhang part being long.

EMBODIMENT 1

Figure 12:
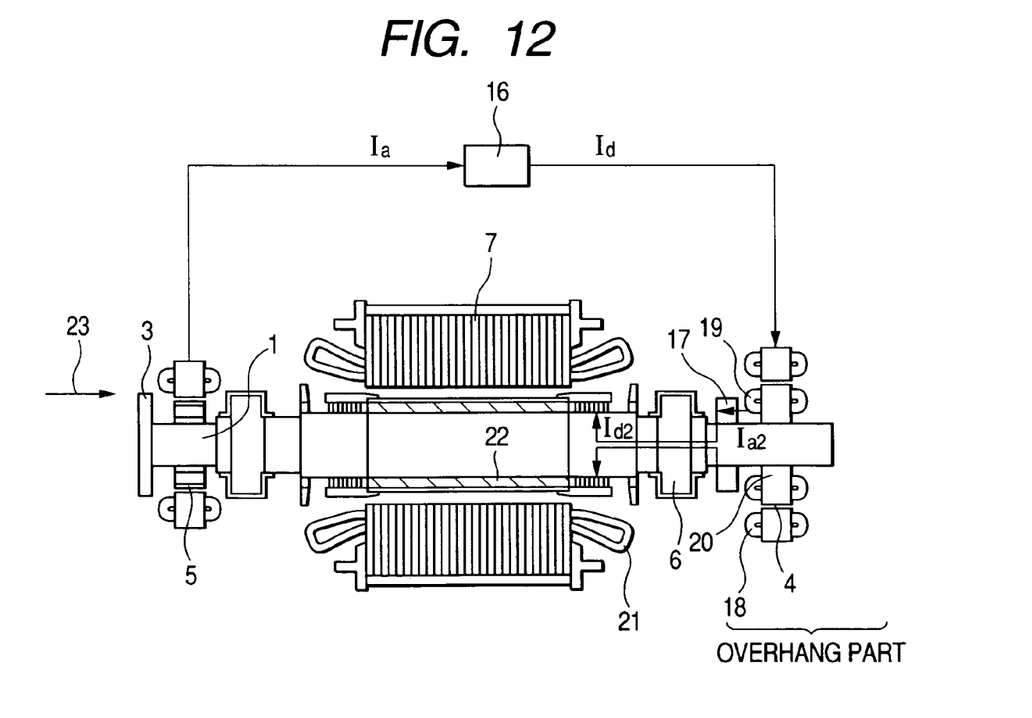
FIG. 12 is a sectional view of the turbine generating system in the first embodiment of this invention.

In the first embodiment of this invention, therefore, as shown in FIG. 12, using the space between a coupling 3 and a rotor shaft 1 of the generator, a sub-exciter 5 is installed. According to this embodiment, the sub-exciter installed in the overhang part in the comparative example is absent from the overhang part, thus it is possible to shorten the overhang part of the rotor shaft 1.

Figure 13:
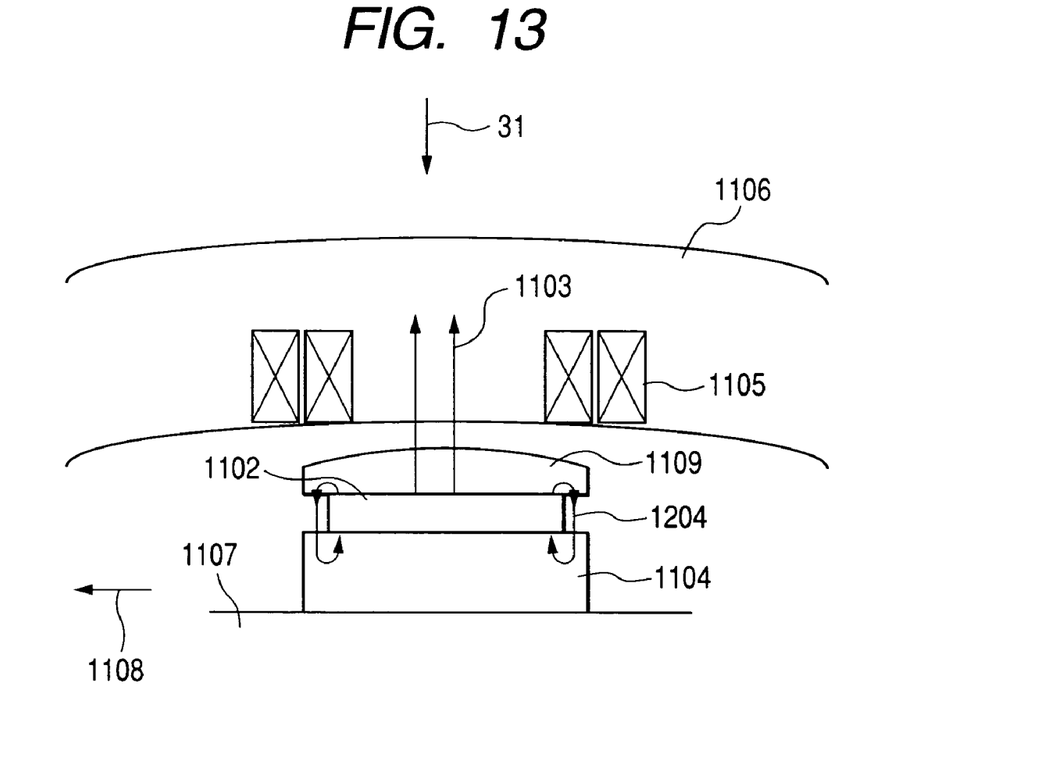
FIG. 13 is a sectional view in the circumferential direction of a part of the generator in the first embodiment of this invention.

Here, if the rotor of the sub-exciter 5 is, as shown in Patent Document 1, so constructed that a magnet is inserted into a slot, it turns out that the magnet needs to be inserted in the direction represented by an arrow 23, but the coupling 3 obstructs the insertion of the magnet. This is why in the embodiment, as shown in FIG. 13, a permanent magnet 1102 is sandwiched by a pole shoe 1109 and a seating 1104 fitting the permanent magnet 1102. This construction allows the permanent magnet 1102 to be placed on the seating 1104 in the radial direction 31, thus even if a presence such as a turbine in the axial direction of the rotor shaft makes it impossible to insert a permanent magnet in the axial direction, a generator for excitation can be installed.

A more detailed description will be given of the construction shown in FIG. 13. The seating 1104 is made of a magnetic material, is placed in the inward radius direction of the permanent magnet 1102 (toward the rotor shaft), and supports the permanent magnet 1102. The pole shoe 1109 is placed in the outward direction of the permanent magnet 1102, and is made of a magnetic material. The numeral 1106 represents a stator, and 1107 a rotor carried so as to be rotatable. The stator 1106 has coils 1105 wound on it, and the rotor 1107 has the permanent magnet 1102 placed on it. The rotation of the rotor 1107 in the circumferential direction 1108 allows the magnetic flux produced by the permanent magnet 1102 to cross the coils 1105 and thereby a voltage to occur in the coils 1105 owing to electromagnetic induction.

In this embodiment, the pole shoe 1109 and a rotor 1107 are secured together with a bolt or a binding, but it is understood that the pole shoe 1109, the permanent magnet 1102, and the seating 1104 and the rotor 1107 may be fixed solidly with a bolt. And in this embodiment the pole shoe 1109, the permanent magnet 1102 and the seating 1104 are rectangular in shape radially, but it is understood that their shape may be circular or elliptic in order to raise their mechanical strength.

In this embodiment, there is a big advantage that a generator can easily be assembled. However, the problem arises that, among the magnetic fluxes given off by the permanent magnet 1102, a magnetic flux 1103 passes effectively the stator 1106, but a magnetic flux 1204 given off by an end of the permanent magnet 1102 goes beside the permanent magnet 1102, and without passing the stator 1106 returns to the permanent magnet 1102, ending up being ineffective for electric generating.

EMBODIMENT 2

Figure 1:
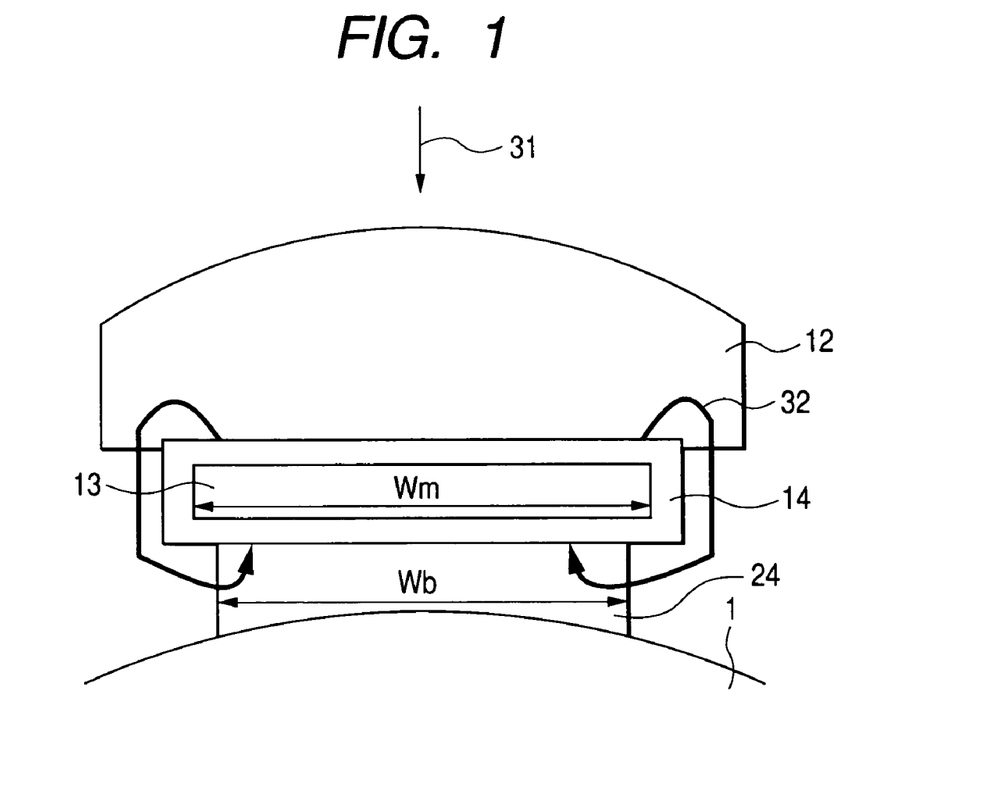
FIG. 1 is a sectional view in the circumferential direction of a part of the generator in the second embodiment of this invention.
Figure 2:
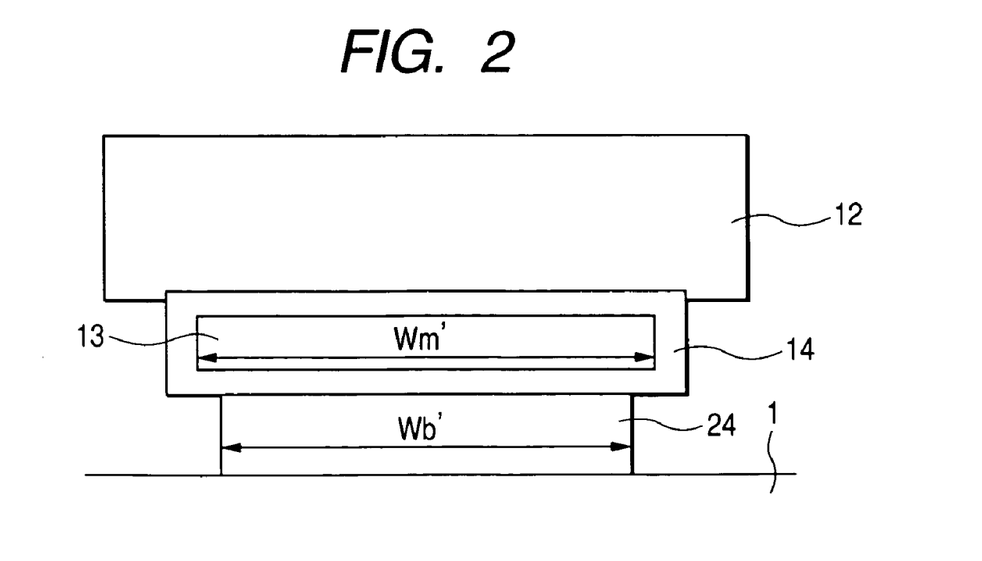
FIG. 2 is a sectional view in the axial direction of a part of the generator in the second embodiment of this invention.

In a second embodiment, therefore, as shown in FIGS. 1 and 2, the width Wm in the circumferential direction of the permanent magnet 13 is greater than the width Wb in the circumferential direction of a seating 24. According to this construction, the magnetic flux given off by an end of a permanent magnet 13 goes beside the permanent magnet 13 and enters the seating 24 by way of a path 32, whose magnetic resistance is so great that there are hardly any fluxes going on this path, and that it is possible to reduce flux leakage. With reference to FIGS. 1 and 2, a more detailed description will be given of the second embodiments of this invention.

FIG. 1 shows a circumferential section of a part of a gererator pole placed in a generator in this embodiment. On a rotor shaft 1 in any given circumferential position is mounted the seating 24 for placing the permanent magnet 13. The seating 24 is formed uniformly with the rotor shaft 1 by machining or formed separately out of a magnetic material, and is located on the rotor shaft 1. The permanent magnet 13 is covered with a cover 14 made of a non-magnetic material in order to prevent scattering. The distance Wm in the circumferential direction of the permanent magnet 13 is greater than the distance Wb in the circumferential direction of the seating 24, thus a pole shoe 12 is farther apart so as to prevent the flux leakage from the pole shoe 12 to the seating 24. This prevents generated voltage from reducing.

FIG. 2 is a axial sectional view of a part of a generator pole placed in a generator in this embodiment. The length Wm in the axial direction of the permanent magnet 13 is greater than the length Wb in the axial direction of the seating 24, thus the flux leakage from the pole shoe 12 to the seating 24 is prevented.

EMBODIMENT 3

Figure 3:
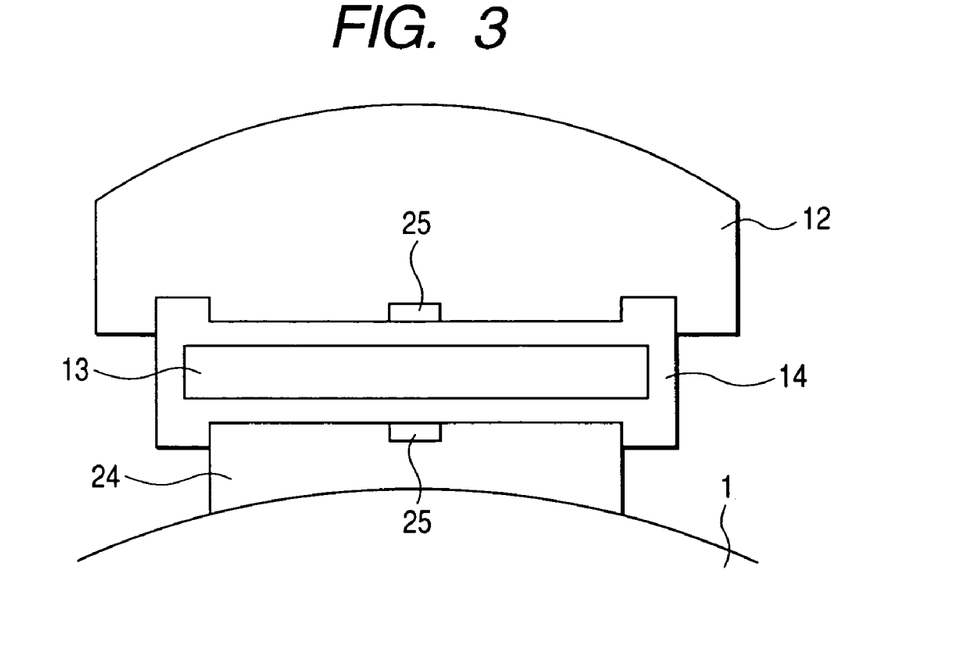
FIG. 3 is a sectional view of in the circumferential direction of a part of the generator in the third embodiment of this invention.

FIG. 3 shows a third embodiment of this invention. It shows a circumferential section of a part of a pole of the sub-exciter mounted in a turbine generator according to this invention. There is placed a permanent magnet 13 between the rotor shaft 1 and a pole shoe 12, the permanent magnet being covered with a cover 14 made of a non-magnetic material in order to prevent scattering. The cover 14 has a convex part on it, and the pole shoe 12 a concave part. Fitting these convex part and concave part into each other on placing the magnet allows the permanent magnet 13 to be held during rotation, and also allows the positioning in the circumferential direction of the permanent magnet 13 and the pole shoe 12 to be easier on assembling and disassembling them.

Borh of the pole shoe 12 and the seating 24 have a concave part 25, respectively which is not fitted on the convex part of the covering 14, thus the disassembly of the permanent magnet 13 is made easier.

Note that in the figures the convex and concave parts are represented by rectangles, but they may take shapes whose section is triangular or circular.

EMBODIMENT 4

Figure 4:
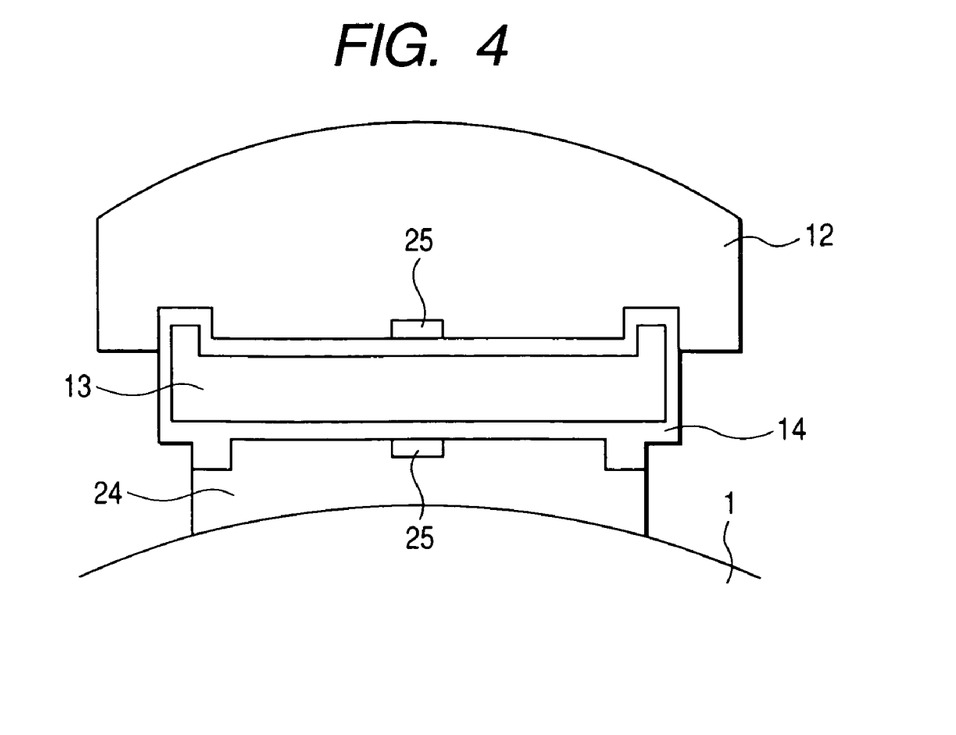
FIG. 4 is a sectional view in the circumferential direction of a part of the generator in the fourth embodiment of this invention.

FIG. 4 shows a fourth embodiment of this invention. It shows a circumferential section of a part of a pole placed in a generator in this embodiment. There is placed a permanent magnet 13 between a rotor shaft 1 and a pole shoe 12, the permanent magnet being covered with a cover 14 made of a non-magnetic material in order to prevent scattering. In addition to the convex parts of the cover 14 and the concave parts of the pole shoe 12 shown in reference to Embodiment 3, the permanent magnet 13 has a convex part, and a seating 24 has a concave part. Fitting these convex part and concave part into each other on placing the magnet allows the permanent magnet 13 to be held during rotation, and also to be assembled and disassembled with more ease.

Borh of the pole shoe 12 and the seating 24 have a concave part 25, respectively which is not fitted on the convex part of the covering 14, thus the disassembly of the permanent magnet 13 is made easier. To remove the pole shoe 12 from the permanent magnet 13 during maintenance, the concave part 25 has only to be picked with a nail.

Note that in the figures the convex and concave parts are represented by rectangles, but they may take shapes whose section is triangular or circular.

EMBODIMENT 5

Figure 5:
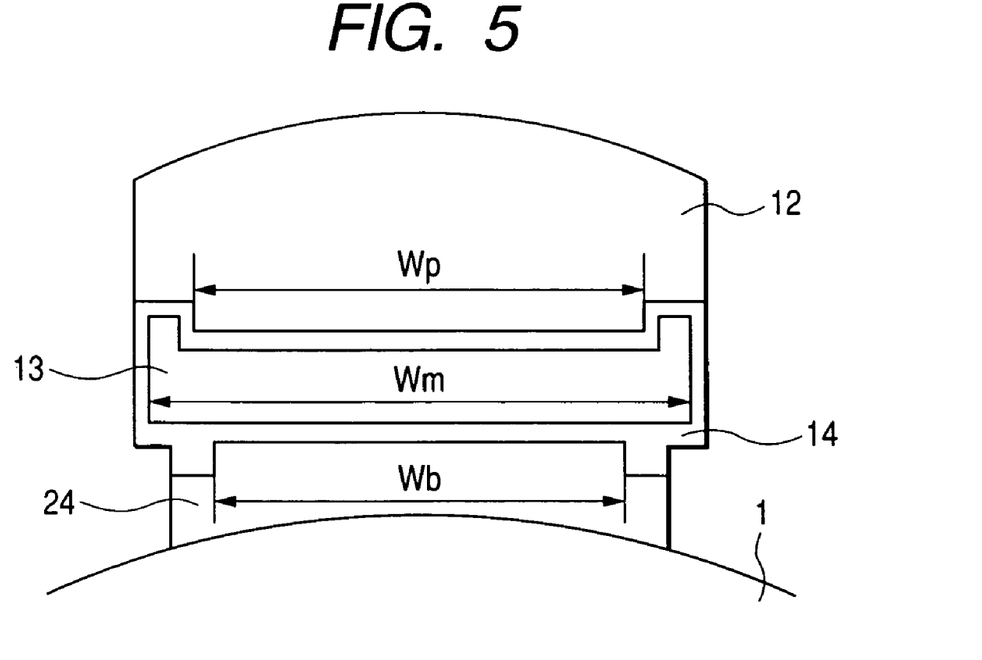
FIG. 5 is a sectional view in the circumferential direction of a part of the generator in the fifth embodiment of this invention.
Figure 6:
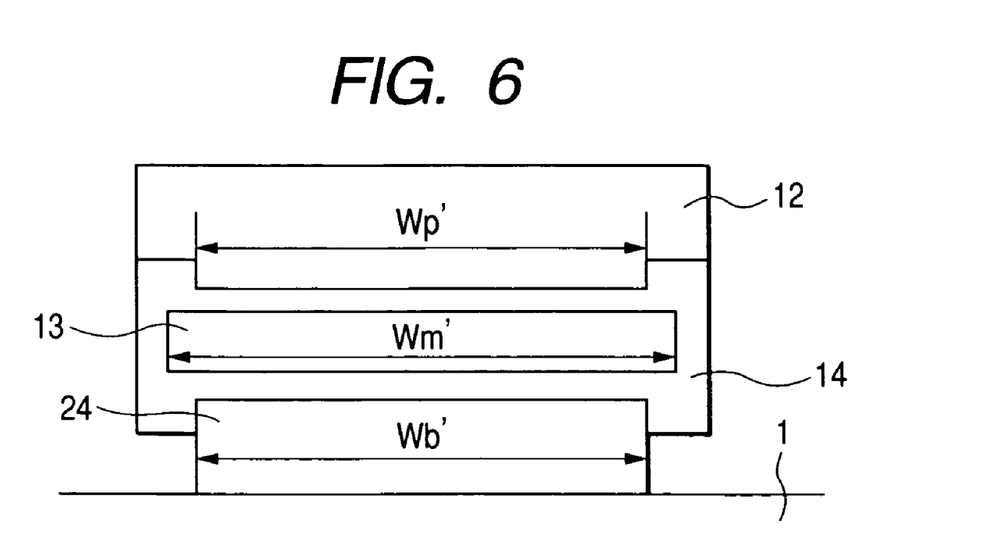
FIG. 6 is a sectional view in the axial direction of a part of the generator in the fifth embodiment of this invention.

FIGS. 5 and 6 show a fifth embodiment of this invention. FIG. 5 shows a circumferential section of a part of a generator pole placed in a generator in this embodiment. The pole shoe 12 has its concave parts, which in the fifth embodiment are in contact with the permanent magnet 13, brought circumferentially to the edges, and has its overall circumferential section made convex, with the result that the length Wm in the circumferential direction of the permanent magnet 13 is greater than the length Wp in the circumferential direction of the convex part of the pole shoe 12. This pole shoe 12 with the concave parts is fitted into convex parts formed in a cover 14 to hold the permanent magnet 13 and to have the pole shoe 12 and a seating 24 located far from each other so as to reduce the flux leakage from the pole shoe 12 to the seating 24 and to prevent the generated voltage of the generator from falling.

FIG. 6 is a axial sectional view of a part of a generator pole placed in a generator in this embodiment. The pole shoe 12 has its concave parts, which are in contact with the permanent magnet 13, brought axially to the edges and has its overall axial section made convex, with the result that the length Wm' in the axial direction of the permanent magnet 13 is greater than the length Wp' in the axial direction of the convex part of the pole shoe 12. This allows the pole shoe 12 and a seating 24 to be located far from each other to reduce the flux leakage from the pole shoe 12 to the seating 24 and prevents the generated voltage of the generator from falling.

EMBODIMENT 6

Figure 7:
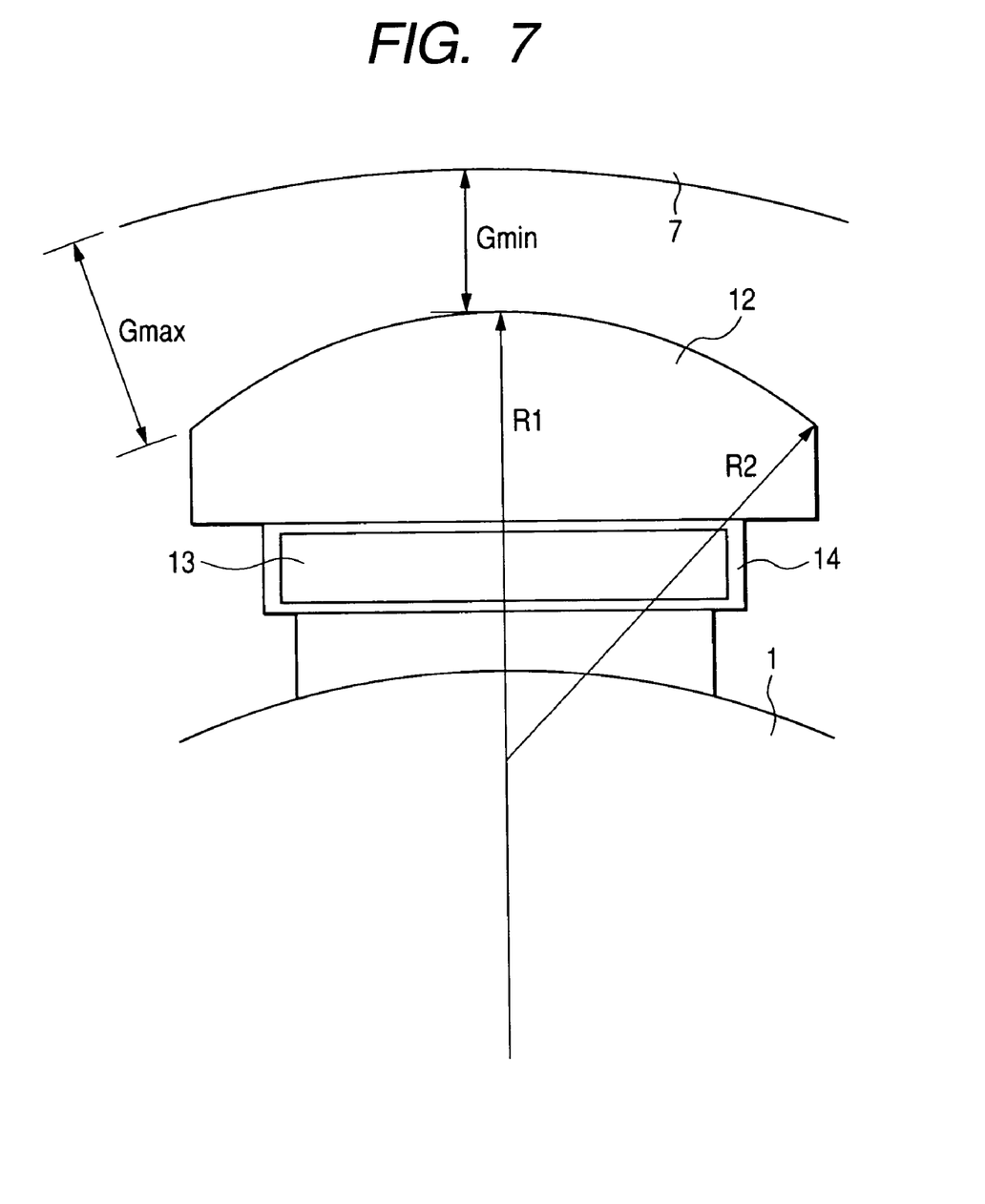
FIG. 7 is a sectional view in the circumferential direction of a part of the generator in the sixth embodiment of this invention.

FIG. 7 shows a sixth embodiment of this invention. It shows a circumferential section of a part of a generator pole placed in a turbine generator of this invention. The radius R2 of the arc part of a pole shoe 12 is smaller than the radius R1 of the rotor 1, thus the outer edge of the rotor 1 and the inner surface of the stator 7 have their maximum gap Gmax and their minimum gap Gmin the ratio Gmax/Gmin of which is given as 1.33 or more.

Figure 8:
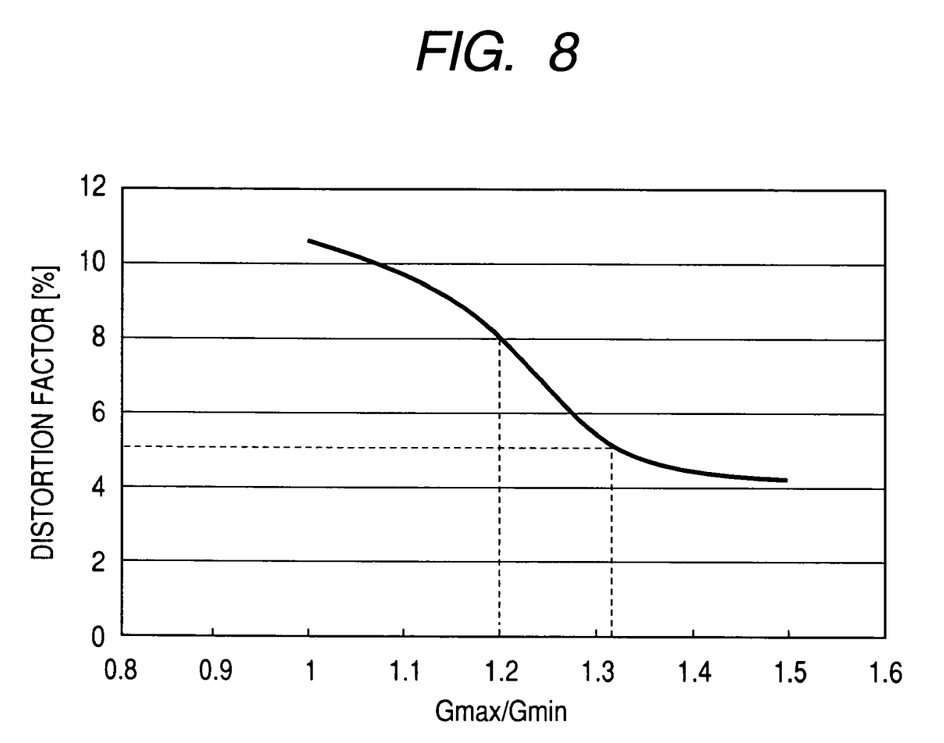
FIG. 8 is a graph showing the relation between Gmax/Gmin and the distortion factor in a sixth embodiment of this invention.

FIG. 8 is a graphs a result of assuming that Gmin is 10 mm and then analyzing the relation between Gmax/Gmin and the distortion factor of a voltage induced in the windings of the armature of the generator. Judging from FIG. 8, giving Gmax/Gmin as 1.2 or more allows the voltage distortion factor to remarkably fall, and giving Gmax/Gmin as 1.33 or more allows the voltage distortion factor to be as small as 5 percent or less.

EMBODIMENT 7

Figure 9:
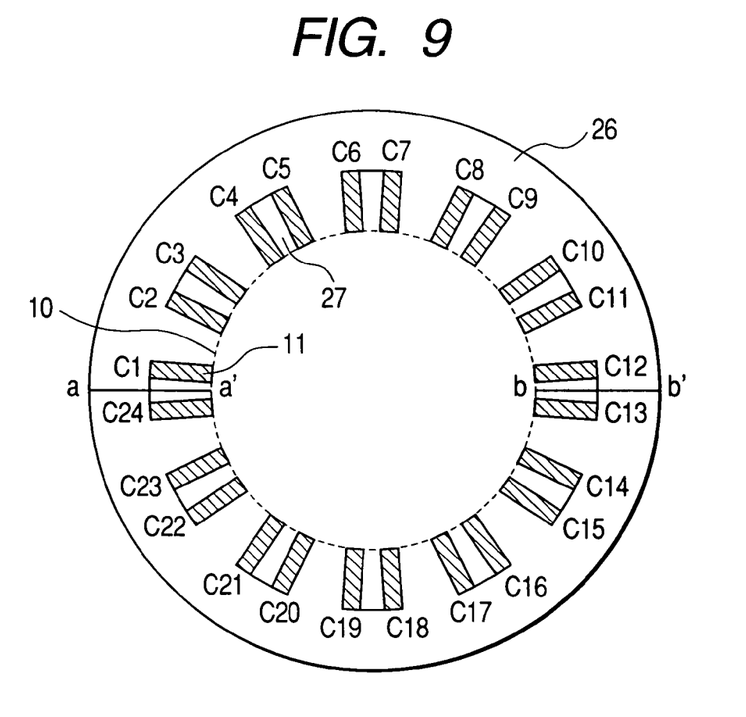
FIG. 9 is a vertical sectional view of the stator in the seventh embodiment of this invention.

FIG. 9 shows a vertical sectional view of the seventh embodiment of this invention. It shows a generator in this embodiment, detailedly a single-phase, two-parallel-circuit stator. Slots 11 contain coils C1 to C24 wound on each tooth 10, respectively. Series winding is applied to coils C1 to C12. Coils not having a tooth in between, for example, C2 and C3, are connected to each other on an overhead part. In the same way, coils C13 to C24 have series winding applied to them. The joints of the windings are only at the single location between C1 and C24 so as to facilitate the jointing of wires and the assembly and disassembly of parts.

According to this embodiment, dividing the stator into two divisions and providing two parallel circuits allows the stator, while kept parted and after each set of parallel-circuit coils is wound on each parted stator, to be assembled. The effect of this embodiment can be obtained by giving the coils as concentrated windings and by giving the number of the phases multiplied by that of the parallel circuits equals to number of the stator divisions.

Note that the iron core 26 of the stator 7 has core parts 27 each of which is located between two slots not having a tooth 10 in between and that two of them are divided along lines a-a' and b-b'. Designating core parts 27 as these divisions allows the windings to be kept intact when parting them. This makes it possible to assemble and disassemble the stator of a sub-exciter 5 without its coils and insulators being damaged by such accidents as hitting.

EMBODIMENT 8

Figure 14:
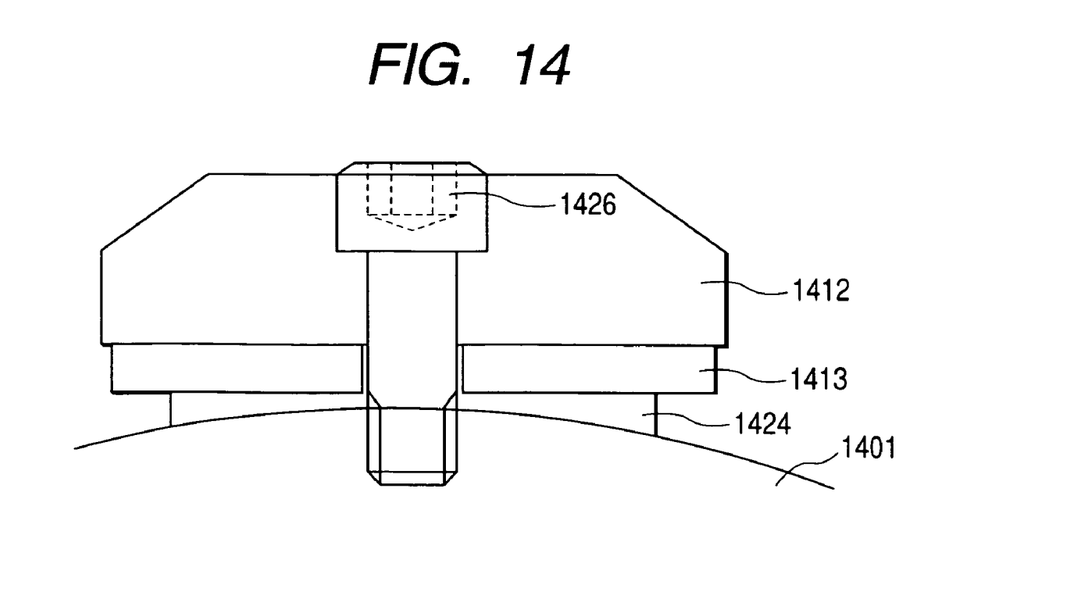
FIG. 14 is a sectional view in the circumferential direction of a part of the generator in the eighth embodiment of this invention.
Figure 15:
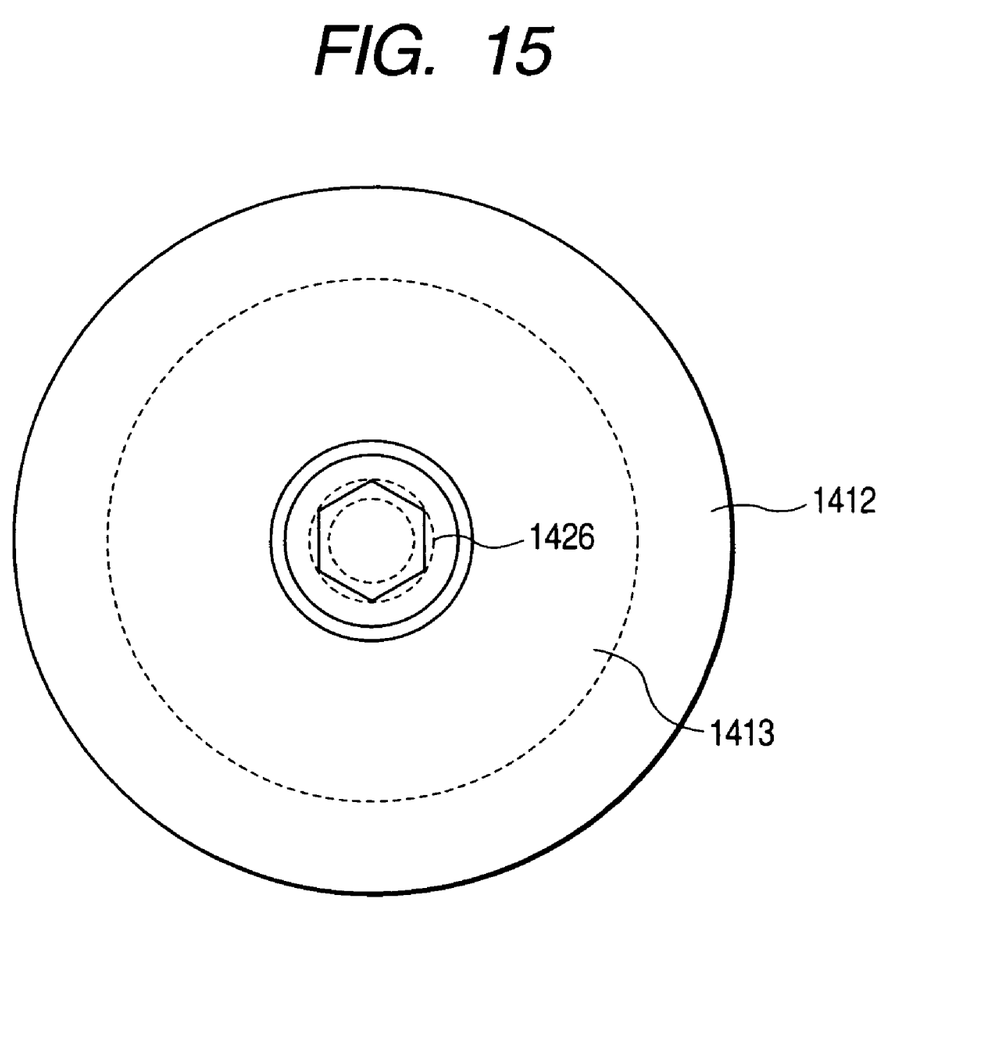
FIG. 15 is a sectional view in the vertical direction of a part of the generator in the eighth embodiment of this invention.

FIGS. 14 and 15 show an eighth embodiment of this invention. FIG. 14 is a circumferential sectional view of a part of a generator pole in this embodiment, and FIG. 15 a vertical sectional view of it, where between a seating 1424 mounted on a rotor shaft 1401 and a circular-cone-shaped pole shoe 1412 there is inserted a ring-shaped permanent magnet 1413. The pole shoe 1412 has an end-enlarged hole formed radially-centered so as to be secured by a non-magnetic bolt 1426. And the permanent magnet 1413 also has a hole formed radially-centered so as to receive the non-magnetic bolt 1426. The non-magnetic bolt 1426 is fastened into the tapped holes formed in the rotor shaft 1401 and the seating 1424 so as to secure the pole shoe 1412 and the permanent magnet 1413 together.

Using a plurality of bolts to keep the pole shoe 1412 and the permanent magnet 1413 in place has a possibility that a certain bolt has their load biased toward it and that the bolt itself or its hole breaks. In this embodiment, one non-magnetic bolt 1426 is used to secure the pole shoe 1412 and the permanent magnet 1413 together, thus such an imbalance of load can be avoided.

Note that using one bolt to secure a pole shoe and a permanent magnet which have a rectangular horizontal section leads to a pronounced warping up at a corner of the rectangle far from the location of fixing. In addition, a pole shoe radially having a uniform thickness leads to a pronounced warping up at its ends during assembly or during operation. In this embodiment, to prevent these, there are a circular-cone-shaped pole shoe 1412 and a ring-shaped permanent magnet 1413. This can prevent excessive warping up at ends.

What is claimed is:

1. A generator comprising:
   a sub-exciter installed in a space between a coupling and a rotor shaft of the generator, the sub-exciter including:

a rotor having a permanent magnet placed therein and supported to be rotatable; and a stator having an armature coil wound thereon, which is placed in a radial outward direction of the rotor;

wherein the rotor is provided with a seating made of a magnetic material for supporting the permanent magnet, which is placed in a radial inward direction of the permanent magnet, a pole shoe made of a magnetic material is placed in a radial outward direction of the permanent magnet, a width in an axial direction of the permanent magnet is greater than that of the seating, and the stator includes a plurality of divisions, and the width of the permanent magnet in the circumferential direction is greater than the width of the seating in the circumferential direction.

2. A generator according to claim 1, further comprising;

the permanent magnet is provided with a cover thereon, the cover has convex or concave parts thereon, the seating has concave or convex parts thereon, and the convex or concave parts of the cover is fitted into their corresponding concave or convex parts of the seating.

3. A generator according to claim 1, further comprising;

the rotor is provided with a pole shoe placed in the outward radial direction of the permanent magnet, the permanent magnet has a cover thereon, the cover has convex or concave parts thereon, the seating has concave or convex parts thereon, and the convex or concave parts of the cover is fitted into their corresponding concave or convex parts of the seating.

4. A generator according to claim 1, wherein the pole shoe and the stator have their maximum gap and their minimum gap between them such that the ratio of the maximum gap to the minimum gap is given as 1.2 or more.

5. A generator according to claim 1, wherein the pole shoe and the stator have their maximum gap and their minimum gap between them such that the ratio of the maximum gap to the minimum gap is given as 1.33 or more.

6. A generator according to claim 1, wherein the product of the number of the parallel circuits in the armature coil on the stator multiplied by that of the number of phases is equal to the number of the stator divisions.

7. A generator according to claim 1, wherein the number of the stator divisions along with the number of the parallel circuits in the armature coil on the stator is two.

* * * * *